Patented Dec. 22, 1936

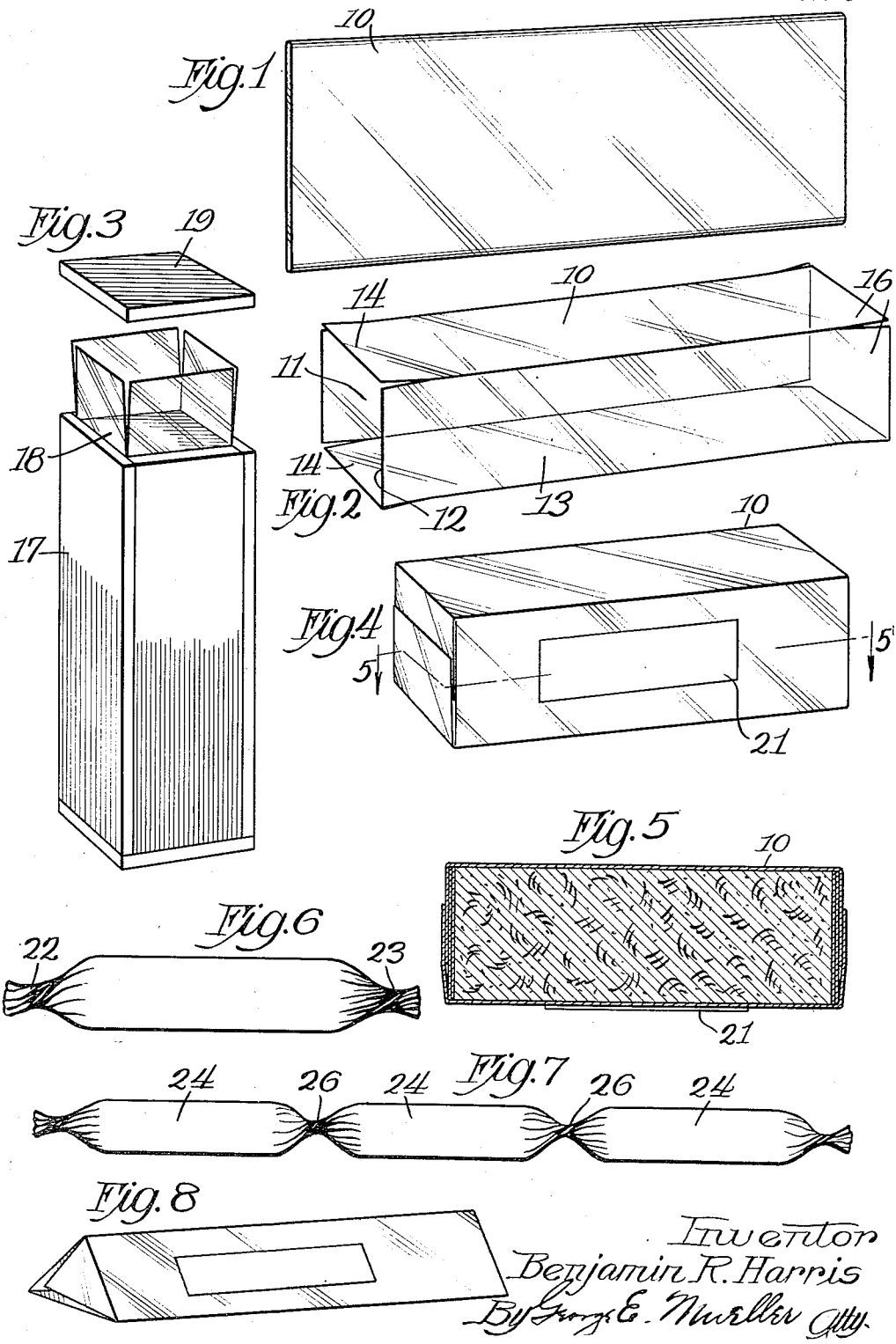

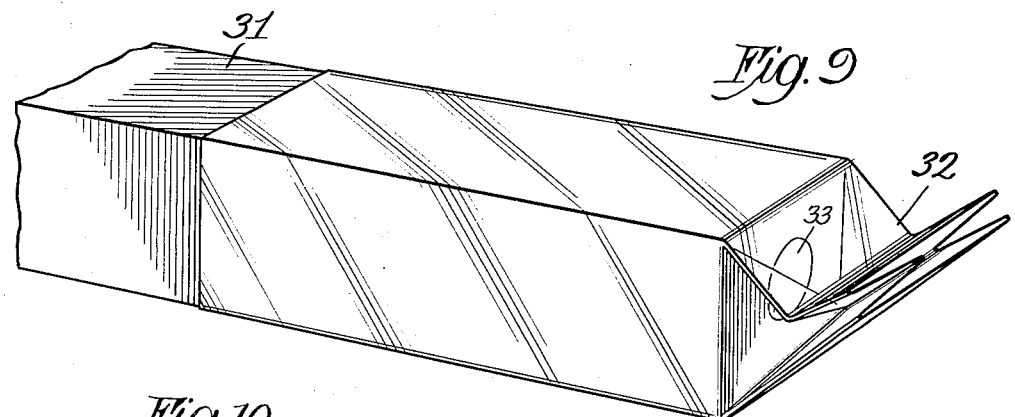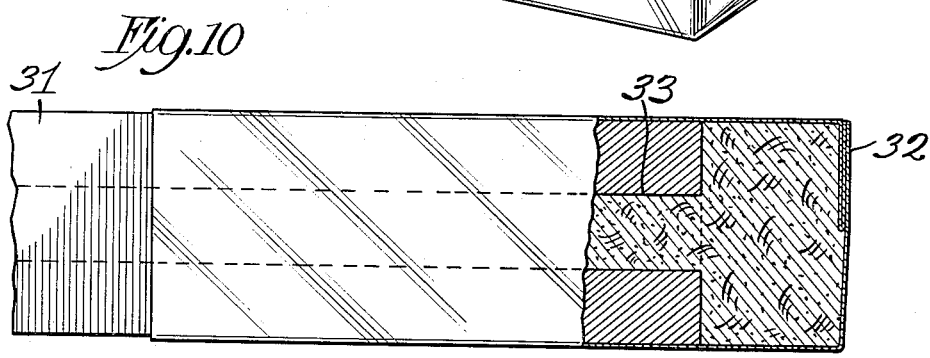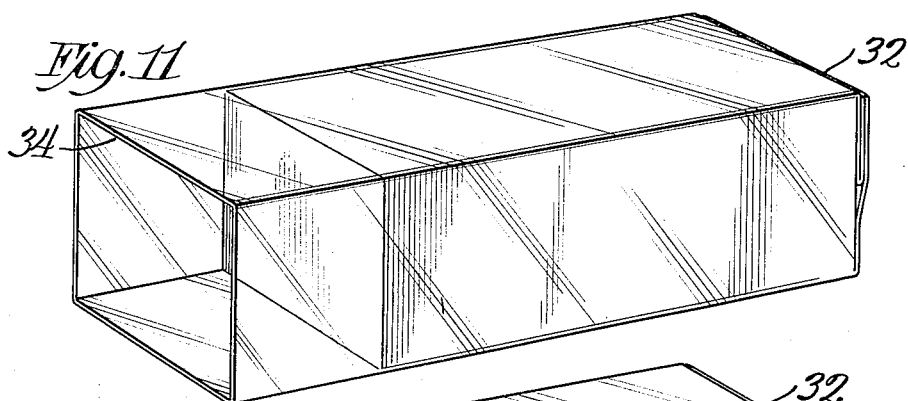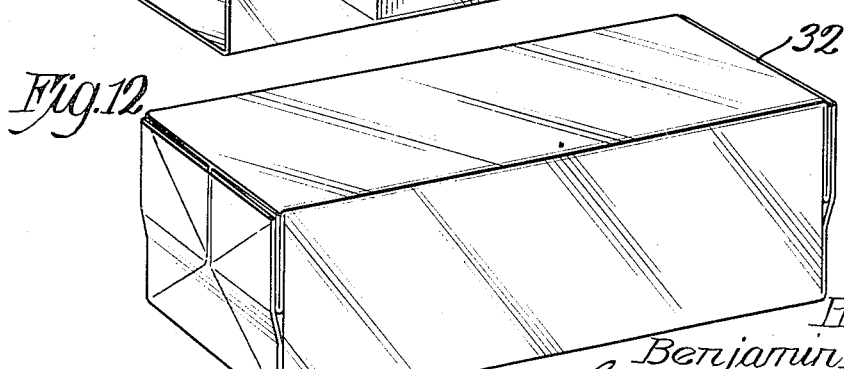

2,065,182

UNITED STATES PATENT OFFICE 2,065,182

PROCESS FOR THE TREATMENT OF CHEESE

Benjamin R. Harris, Chicago, Ill., assignor to Kraft-Phenix Cheese Corporation, Chicago, Ill., a corporation of Delaware Application May 31, 1930, Serial No. 458,249

9 Claims. (Cl. 99—178)

My invention relates to improved processes for the treatment of cheese. More specifically, the invention has to do with the packaging of cheese.

Considerable development has taken place in recent years in the art of preparing cheese for the market, particularly hard cheeses of the so-called "Cheddar" type, which are at their best at a certain stage of ripening and are preferably offered to the public for use when in their best condition. Processes have been developed for the treatment of such cheeses, whereby the cheese is taken at its best stage of ripening and further ripening arrested by pasteurizing processes, including heating to render the cheese plastic, after which the treated cheese is packaged while plastic and warm in such a way as to reduce further bacterial and enzymic action. Unless precautions are taken during the heating, the cheese is apt to suffer from de-emulsification so as to be no longer a homogeneous emulsion. Means have been developed for reducing this de-emulsification, and these means include the addition of chemical compounds in the nature of homogenizing agents or substances for preventing the de-emulsification of the cheese.

I have discovered that the homogenizing substances heretofore used in cheese making are susceptible of considerable modification and improvement. I have found that the methods heretofore used in packaging cheese are not fully satisfactory because the foil so covers the cheese that it is impossible to tell whether or not the cheese is mouldy from the inspection of the package itself. Since the foil is not entirely imperforate, it is not advisable to keep packaged cheese of this type for a longer time than two or three months, which is not long enough to make available the most satisfactory commercial means of distribution. Furthermore, this process of packaging is not well adapted for use with small packages which may be vended without opening to the consumer; this method being more adapted for use with relatively large packages containing for example, above five pounds of cheese. In addition to the keeping qualities I have also found that the acid and other substances in the cheese are very apt to cause corrosion and discoloration of the foil, and while the cheese is not necessarily unfit for human consumption on account of the corroded condition of the foil, it may render the package unsightly and unsalable. Moreover, the corrosion of the foil may admit air to the cheese contents, and spoilage then soon occurs.

Accordingly, the principal object of my present invention is to improve the methods of preparing and vending cheese.

Another object is the provision of an improved type of homogenizing substance for use with cheese.

Another object is to provide an improved cheese package.

Another object is to pack cheese in such a way as greatly to prolong the period during which it can be kept in a salable, edible condition.

Other objects and features of the invention will be apparent from a consideration of the following detailed description taken with the accompanying drawings, wherein, Fig. 1 is a perspective view of an improved form of wrapper which I use in the practice of my invention, Fig. 2 shows the wrapper opened and prepared for introduction of the cheese, Fig. 3 shows the manner in which the wrapper is secured in a mold, Fig. 4 shows one form of finished package, Fig. 5 is a sectional view thereof taken along the line 5—5 of Fig. 4, Fig. 6 is a view of a modified shape of package, Fig. 7 is a further modification, Fig. 8 shows the use of a triangular shaped package, and Figs. 9, 10, 11, and 12 are views showing another method in which the invention can be practiced.

In general, my process consists of preparing cheese for packaging by the application of heat or in other ways to render the product sufficiently sterile and plastic. The prepared cheese is then packaged and I employ for this purpose a transparent and seamless cellulosic wrapper which absolutely excludes all air or other objectionable substances from the cheese, maintains the cheese in a wholesome condition for a greater length of time, and offers the cheese for sale in a condition in which the purchaser is able to inspect the cheese directly through the wrapper before purchasing the same. Since the cellulosic wrapper is not affected in any way by the acid substances or other contents of the cheese, it will not be discolored or corroded, and even after long periods of time after the package has been prepared, it may be offered for sale in substantially the same condition in which it was originally prepared.

In connection with the preparation of the cheese for packaging I may also employ any of the homogenizing substances heretofore used. I have found, however, that ripened cheese may be treated more satisfactorily with anti-acid salts of organic acids having more than two hydroxy groups in the molecule, preferably four or five hydroxy groups to the molecule. Heretofore, the substances used have not contained more than one or two hydroxy groups to the molecule, and while such substances have had their use in the art, they do not have the advantages to be obtained from the use of my new substances, as will be more fully described hereinafter.

I shall first refer to the mechanical features in connection with the packaging, with reference to the attached drawings.

The envelope in which I enclose the cheese is a sleeve-like body of transparent cellulosic material such as suitably processed cellulose nitrate, but the chemical nature of this transparent wrapping material will be referred to more in detail later. This sleeve-like wrapper as shown in Fig. 1 is capable of being given a variety of shapes in accordance with the cross section desired in the finished package.

Figs. 2 to 5 inclusive show the use of a package of rectangular cross section, which is a convenient shape to use for most purposes. In preparing this package various methods may be used, one of which is illustrated in detail. The transparent sleeve-like wrapper is first folded to rectangular shape so as to have sides 10, 11, 12, and 13. The articulated edges are then cut a short distance from the ends to produce a plurality of flaps 14—14 and 16—16. These flaps are folded over to close one end of the rectangular body and the shaped wrapper is then placed in a vertical position within a mold 17. This mold is of a proper size to accommodate the wrapper and to hold the amount of cheese which it is desired to place within the wrapper. This leaves flaps 16 projecting above the mold. The cheese 18 which has been prepared in a sufficiently plastic condition to be placed in the mold and fill out all sections thereof, is then introduced into the wrapper lined mold as shown in Fig. 3. The flaps 16 are then folded over to cover the top of the cheese, and a cover 19 may then be placed in position on top of the mold 17. I wish to point out that the mold may be used only for the purpose of forming the cheese, or it may constitute a wooden box in which the cheese is to be shipped, in which event, the cover 19 is nailed directly to the top of the box mold, thus holding the flaps 16 down against the top of the cheese.

Although good results are obtained in the practice of my invention by simply folding the flaps over and allowing them to adhere to the cheese, and so obtain the necessary sealing, I prefer to treat the flaps themselves by a suitable adhesive so that a completely imperforate wrapper results. I may employ for this purpose a cellulose derivative solution which can be coated entirely over the end of the wrapper, or I may merely brush the flaps with a solvent which will cause them to adhere together and produce an imperforate structure. Or, any other sealing means may be employed so that the final wrapper is in the shape of an imperforate envelope of transparent, hygroscopic material which will maintain the cheese in a wholesome condition for an indefinite length of time.

When the cheese is to be furnished in a relatively large block, for example a number of pounds in one piece, I prefer to pack it in an outer wooden container something like the mold shown in Fig. 3.

However, when small packages are to be produced so that the original package can be delivered intact to the consumer, I prefer not to use a wooden box covering, at least not for the individual packages. When produced in this way the packages may consist of nothing but a cellulose wrapper provided with a suitable label 21, and when handed to the consumer, are in such shape that they can be freely and easily inspected without opening the package.

Instead of employing a mold and producing a rectangular shaped package I may employ a sleeve-like wrapper similar to that shown in Fig. 1, but produce a round package as shown in Fig. 6. In this case the sleeve-like wrapper is used in somewhat the same manner as a sausage casing, the cheese being placed in the wrapper in proper condition, and the ends 22 and 23 twisted so as to completely seal the wrapper at both ends.

This sausage shaped cheese package may be a relatively large package to hold approximately a pound of cheese or packages as shown in Fig. 7 may be used, in which a number of packages 24 are formed from a single sleeve-like wrapper, links 26 being formed between the successive packages by simply twisting the wrapper between the successive packages. This method of packing is very satisfactory where relatively small portions are to be vended separately, for example quarter or half-pound portions.

The package shown in Fig. 8 is illustrative of another style which may be used, but this form is preferably prepared by means of a mold. It is obvious that by employing a sleeve-like casing of the character described, in connection with a mold, cheese can be produced in almost any cross sectional shape, and this may be of considerable importance not only from the standpoint of producing a better product, but it permits the manufacturer to offer to the trade distinctive types of packages readily recognizable on account of their unique shape. The advantage of this fact, from the standpoint of commercialization and merchandizing is unquestioned.

I wish to point out that the manner of introducing the cheese into the wrapper may be modified very greatly. When using a mold as shown in Fig. 3, the plastic cheese may be simply poured into the mold and allowed to settle by gravity and fill out all portions of the mold. I may, however, introduce the cheese under pressure into the casing, and this method is particularly adapted for use when producing the sausage shaped package shown in Figs. 6 and 7. For example, I may use a packaging machine substantially the same as now used in the manufacture of sausage, and the cheese may then be produced in a continuous manner and in such a way that a thoroughly sterile product, in a thoroughly imperforate water proof package is produced.

Figs. 9 to 12 inclusive, show another and improved manner in which the invention can be produced, this embodiment of the method however, including the same main features of the invention as set forth in connection with the remaining figures. The sleeve is drawn around a form 31 of suitable cross-sectional shape, and of a proper size to substantially fill out the sleeve. Then, without cutting the edges of the sleeve, a portion 32 projecting from beyond the form is folded in the manner indicated so as to lie flat against the end of the form and close the sleeve at this end. Suitable adhesive can be used for holding the folded portions in position and the adhesive may be applied in most any way without any possibility of coming in contact with the cheese. When the sleeve has been closed in this manner, the form may be removed and the sleeve then filled with the plastic cheese; or still another way may be used for introducing the cheese which will now be described and which has certain valuable features.

As Fig. 9 shows, the form 31 has a passageway 33 which extends therethrough and is adapted to communicate with a suitable source of supply of plastic cheese. Then, as Fig. 10 shows, cheese may be forced through the passageway 33 as the form is withdrawn from the sleeve, leaving the sleeve completely filled with cheese as the form is withdrawn, so that there is no possibility whatsoever of air being entrapped and afterwards resulting in a spoiling of the cheese.

Fig. 11 shows the appearance of the package when the form has been completely withdrawn and before the remaining open end of the sleeve has been closed to thoroughly seal the cheese therein. After the form has been removed, the projecting portion 34 of the sleeve is then folded in substantially the same manner as shown in Fig. 9 in connection with the end portion 32, and the package is then complete.

When the cheese is introduced into the package in the practice of this embodiment of the method, the sleeve may also be placed in a mold as shown in connection with other features of the invention, and the mold will have any suitable cross-sectional shape, to correspond with the shape of the form 31. I have found, however, that the method may also be practiced without a mold, but in most cases possibly the use of the mold is preferred.

Among the advantages to be secured from the use of my method, and the resulting package, is that when the cheese shrinks after cooling, the cellulose wrapper will shrink with the cheese, and so protect the cheese surface at all times and under all circumstances.

While the best results in the packaging of cheese are obtained by bringing the cheese to a plastic, flowing condition before packaging, I may form the cheese first, then place it in the envelope, and finally seal it under sterile conditions. I may do this by extrusion so that the cheese in substantially solid form may be forced into the casing, and still obtain most of the advantages to be had from the use of a package of the character described, or this same result may be had in other ways.

I am aware of the art practiced heretofore, in which case tin foil was used as a material to cover cheese. Cheese usually contains a considerable amount of lactic acid and many other substances resulting from the bio-chemical changes, which take place during the ripening of the cheese, and end products of metabolism of various micro-organisms. In the case where tin foil is used as a wrapping, corrosion or discoloration may take place, whereas in my invention, which uses a material substantially inert to the substances which are present in cheese, such discoloration or corrosion is obviated.

Tin foil itself has a relatively small coefficient of expansion and contraction and does not always satisfactorily seal the cheese. In my invention I have discovered that the cellulose products which I use have a certain amount of stretchability, which is especially pronounced when they come in contact with a hot, moist cheese mass. On cooling my wrapper shrinks, thus displacing practically all the air and producing a package which is much better sealed. This prolongs the life and keeping qualities of the product.

A specific method by means of which I may carry out my entire process is to take a Cheddar cheese alone, or blended with other types if desired, or any cheese made by a cheddaring process, grind the cheese and place it in a heating receptacle. Heat is then applied by passing steam through the mass while agitating it. The heat may be applied to the outside of the container, with suitable precautions to prevent overheating. Heating is continued with agitation until the proper consistency is imparted to the cheese, or until the product obtains some mobility and loses its rigidity.

In order to prevent the separation of the constituents of the cheese it is advisable to add a small proportion of water, varying from 2% to 5%, and to reduce the acidity by dissolving in or mixing with this water a suitable quantity of an innocuous anti-acid substance in proportions varying from 1% to 3% on a basis of the finished product. The material may be stirred and heated from fifteen to thirty minutes at a temperature of 150 to 160°, or above if desired, until the proper plasticity is obtained, and it is then introduced into the cellulosic wrapper in one of the ways outlined above.

As to the material used for the transparent wrapper, this is subject to considerable modification. Cellulose acetate may be used, cellulose nitrate, cellulose hydrate, or various kinds of hydrocellulose or other derivative esters, or ethers of cellulosic material capable of being fabricated into a translucent or transparent sheet, tinted or untinted.

As previously suggested, I use an improved homogenizing substance, preferably anti-acid in character, having more than two hydroxy groups in the molecule, preferably salts of organic acids, such as the salts of gluconic, mucic, saccharic, or other such acids. Among the salts of acids with which I have obtained good results are sodium malate, sodium succinate, sodium mucate, sodium gluconate, calcium gluconate, or combinations thereof.

The advantage of such anti-acid substances over homogenizing substances used heretofore is derived from the portion of the molecule which resembles sugar in chemical structure. Sugars are known to benefit the dispersion of casein by their presence in cheese, but unfortunately they suffer from the disadvantage that first, they generally contribute a sweet taste which may be out of place in cheese, and secondly, they are subject to fermentation and gas formation, which in general is objectionable in cheese. My anti-acid substances do not contribute the sweet taste and are practically immune from fermentation with gas formation.

I have described the features of my invention in considerable detail in order that those skilled in the art may understand and practice the same. It is obvious, however, that I do not limit myself to the features shown and described, the invention being limited only by the scope of the appended claims.

What I claim is new and desire to protect by Letters Patent of the United States is:

1. The method of preparing cheese for distribution which includes forming an envelope in the form of an imperforate open ended sleeve of transparent cellulose derivative material, heating cheese to render the same plastic, introducing the plastic cheese into the transparent cellulose derivative sleeve while supporting the same in a mold of proper cross sectional shape, bringing sections of the cellulose sleeve around ends of the cheese to cover the same while the cheese is plastic, and finally treating such ends to render them substantially imperforate and impervious to moisture.

2. The method of preparing cheese for distribution, which includes forming an envelope in the form of an open ended sleeve of transparent cellulose derivative, heating cheese to pasteurize the same and render it plastic, introducing the plastic cheese into said sleeve, bringing the sleeve around to close the open ends thereof while the cheese is plastic so that the plastic cheese is in contact with the entire inner surface of the sleeve, and allowing the cheese to cool, the sleeve continuing in contact with the cheese as it contracts during cooling.

3. The method of preparing cheese for distribution which includes forming an open ended sleeve of transparent cellulose derivative material, folding one end of the sleeve to close the same, placing the sleeve in a mold with the folded end in a closed end of the mold, heating cheese to render the same plastic, introducing the plastic cheese into the sleeve within the mold, and folding the open end of the sleeve against the introduced cheese while the cheese is plastic.

4. The method of preparing cheese for distribution which includes forming an open ended sleeve of transparent cellulose derivative material, folding one end of the sleeve to close the same, placing the sleeve in a mold with the folded end in a closed end of the mold, heating cheese to render the same plastic, introducing the plastic cheese into the sleeve within the mold, folding the open end of the sleeve against the introduced cheese while it is in a plastic condition, and finally treating said folded ends to render the same substantially imperforate and moisture proof.

5. The method of preparing cheese for distribution which comprises forming an imperforate open ended sleeve of transparent cellulose derivative material, introducing the cheese into the sleeve so that the sleeve is filled out and placed in intimate contact with the cheese, and finally treating the ends of the sleeve to close the same and produce a fully imperforate transparent envelope around the cheese.

6. The method of preparing cheese for distribution which includes forming a sleeve like body of transparent cellulose derivative material, heating cheese to render the same plastic, forcing the plastic cheese under pressure into the sleeve, and then closing the ends of the sleeve while the cheese is in a plastic condition.

7. The method of preparing cheese for distribution which includes forming an open ended seamless sleeve of cellulose derivative material, placing a form within the sleeve having substantially the dimensions of the finished cheese product, folding the sleeve over one end of the form to close said sleeve, withdrawing the form, filling the sleeve with cheese, and then folding the sleeve at the remaining open end over the cheese to close such end, and produce a final imperforate package.

8. The method of preparing cheese for distribution which includes forming an open ended sleeve of cellulose derivative material, placing within said sleeve a form having a passageway therethrough, folding said sleeve about the form to close one end of the sleeve, admitting cheese in plastic condition through said passageway while withdrawing said form so that the sleeve is filled out with cheese free of entrapped air, and finally closing the other end of the sleeve when the form has been completely withdrawn.

9. A method of preparing cheese for distribution, which includes forming a wooden mold having an open end, forming a transparent tubular cellulose derivative wrapper to correspond to the cross sectional shape of the mold, folding one end of the wrapper to close the end thereof, inserting the wrapper longitudinally within the wooden mold so as to leave a portion of the wrapper extending in an open position beyond the mold, heating the cheese to render the same plastic, pouring the cheese into the wrapper within the mold so as to fill out all portions thereof and exclude the air therefrom, folding the extending ends of the wrapper to cover the end of the cheese, and finally securing a cover to the mold end to form a complete package for distribution.

BENJAMIN R. HARRIS.